July 10, 1951 R. A. MAKEPEACE 2,559,888
HIGH AND LOW FREQUENCY CONTROL FOR AMPLIFIER CIRCUITS
Filed Sept. 20, 1947
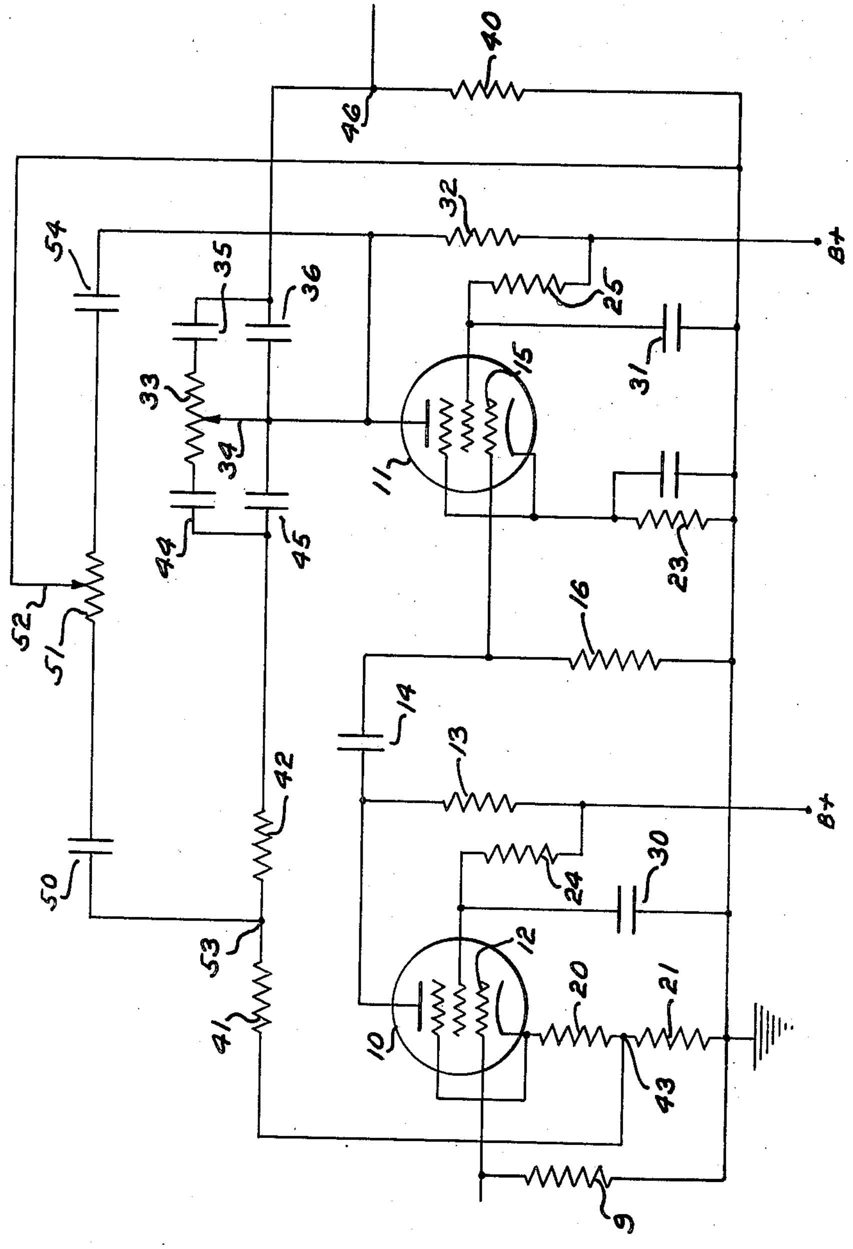
INVENTOR
R. A. MAKEPEACE
BY E. F. Kane
ATTORNEY Patented July 10, 1951 2,559,888

UNITED STATES PATENT OFFICE 2,559,888

HIGH AND LOW FREQUENCY CONTROL FOR AMPLIFIER CIRCUITS

Ronald A. Makepeace, Montreal, Quebec, Canada, assignor, by mesne assignments, to Northern Electric Company, Limited, Montreal, Quebec, Canada, a corporation of Canada Application September 20, 1947, Serial No. 775,285

18 Claims. (Cl. 179—171)

This invention relates to apparatus for regulating the frequency characteristics of electric circuits and more particularly to bass and treble control circuits for amplifiers.

Many tone control circuits have heretofore been developed for use in electronic amplifiers. However, it is believed that all of the circuits require separate controls for bass attenuation and boost so that if it is desired to control both the attenuation and boost of the higher frequencies two separate controls are required and if it is desired to control both the attenuation and the boost of the low frequencies at least two additional controls are required.

It is an object of this invention to provide a new and efficient apparatus for controlling frequency characteristics of electrical circuits.

In accordance with one embodiment of this invention a resistance-coupled audio amplifier having degenerative feedback from the output of one stage to the cathode circuit of a tube in a prior stage is provided with a high frequency network connected between the output of the one stage and the cathode circuit of the prior stage and ground. A variable resistor in the high frequency network when adjusted in one direction attenuates the high frequencies by by-passing a portion of the high frequency output voltage of one stage to ground and simultaneously increasing the high frequency voltage at the cathode end of the degenerative feedback circuit. The opposite effect will be obtained when the resistor is adjusted in the other direction, that is, the high frequencies will be boosted because less of the high frequency output is by-passed to ground and the high frequency voltage at the cathode end of the degenerative feedback circuit is simultaneously decreased. To furnish control for the lower frequency, a low frequency network is connected between the output circuit of one stage and the cathode circuit of a preceding stage, and is provided with a variable resistor which, if adjusted in one direction, will attenuate the low frequencies by decreasing the low frequency output voltage in the output coupling of one tube and simultaneously increasing the voltages at lower frequencies in the degenerative feedback circuit. Conversely, if the resistor in the low frequency network is adjusted in the opposite direction, the low frequencies will be boosted because of an increase in the voltage at low frequencies in the output coupling circuit and a simultaneous decrease of the low frequency voltage in the degenerative feedback circuit. The variable resistors provide a smooth transition from maximum attenuation, through zero (arbitrary reference level) to maximum boost at both high and low frequencies and independent of each other.

A complete understanding of the invention will be had by reference to the following detailed specification taken in conjunction with the single figure drawing which is a circuit diagram of the high and low frequency control circuits adapted to a conventional resistance-coupled amplifier.

As shown in the drawing, an electronic amplifier comprises a first stage centering around a vacuum tube 10 and a second stage centering around the vacuum tube 11. The tubes 10 and 11 may be pentodes each having a plate, a suppressor grid, a screen grid, an input control grid and a cathode which may be either directly or indirectly heated. The signal to be amplified is applied to the input grid 12 of the tube 10 in the first stage. A resistor 9 provides a return to ground for the grid 12.

The output of the first stage may be coupled, for example, by means of a resistance coupling to the second stage employing a suitable load resistor 13 connected in the plate circuit of the tube 10, a coupling condenser 14 connected between the plate of the tube 10 and the input grid 15 of the tube 11, and a resistor 16 connected between the input grid 15 of tube 11 and ground. Cathode bias is provided by means of the resistors 20, 21 and 23 connected in the cathode leads of the tubes. Resistors 24 and 25 are screen voltage dropping resistors for the screen grids of the tubes 10 and 11, respectively. Screen by-pass condensers 30 and 31 may be connected between ground and the screen grids of the tubes 10 and 11, respectively. The output of the tube 11 may be coupled to the input grid of a tube in the next stage, not shown, by means of a resistance coupling circuit which includes a load resistor 32, a portion of a potentiometer 33 having an adjustable arm 34, condensers 35 and 36 and a resistor 40.

Degenerative feedback from the plate circuit of the second stage to the cathode circuit of the first stage is provided by a circuit including resistors 41 and 42 connected in series, one end of resistor 41 being connected into the cathode circuit of tube 10 at a point 43 between resistors 20 and 21, and one end of resistor 42 being connected to condensers 44 and 45. The other side of condenser 44 is connected to the plate of the tube 11 through potentiometer 33 whereas condenser 45 is connected directly to the plate of the tube 11. Any part of the output current flowing through the degenerative feedback circuit causes a voltage drop across resistor 21 which is algebraically added to the signal and bias of the tube 10, and produces the effect of a voltage on the input grid 12 180° out of phase with the signal so that the output of the tube 10 will be diminished.

A proper selection of related values for the resistors 21, 41, 42, condensers 35, 44, and the potentiometer 33, provides an excellent low frequency network by means of which adjustable attenuation and boost of the low frequency voltages are provided in a single control, the potentiometer 33. In one particular embodiment the following values were found to provide excellent control for the relatively low frequencies with a bass boost rising from a reference level to plus 12 decibels at 50 cycles per second and a bass attenuation down to minus 12 decibels at 50 cycles per second (reference frequency 1,000 cycles per second): resistor 21—27,000 ohms; resistor 41—220,000 ohms; resistor 42—220,000 ohms; condenser 35—.1 microfarad; condenser 44—.1 microfarad and potentiometer 33—2 megohms. Condensers 36 and 45 may be of such a value, for example, 500 micromicrofarads, as to provide a virtual cutoff of the lower frequency but which will provide a lower reactance to the higher frequency (treble notes). The control provides smooth bass attenuation or boost between the limits of minus 12 decibels and plus 12 decibels with respect to an arbitrary reference level and the reference frequency.

Movement of the potentiometer arm 34 to the right as viewed in the drawing will reduce the impedance to low frequency voltages between the plate of the tube 11 and a point 46 which may be connected to the input grid of a tube in the next stage, not shown. As a result, low frequency voltages of greater amplitude will appear at the point 46 thereby boosting the output voltage at lower frequencies. Simultaneously, an additional boost to the low frequencies is caused by a reduction of the degenerative feedback voltage appearing at the connection 43 between the resistors 20 and 21 due to the fact that when the potentiometer arm is moved to the right a higher impedance is offered to the low frequencies in the degenerative feedback path. Of course, the lower the degenerative voltage between resistors 20 and 21 the less effect will they have on the incoming signal of the same frequencies which amounts to a net boost of those particular frequencies in relation to a particular reference level.

Conversely, the opposite effect, attenuation of low frequencies, is obtained when the potentiometer arm 34 is moved to the left. This increases the impedance to low frequency voltages between the plate of the tube 11 and the point 46 and, therefore, the low frequency voltages appearing at point 46 leading to the input grid of the next stage will be reduced in value. Simultaneously, additional attenuation results from the reduction in impedance to low frequencies in the feedback circuit due to the lowering of the resistance between the plate of the tube 11 and the condenser 44. The low frequency degenerative feedback voltage which will appear at point 43 will be of greater amplitude thereby reducing the low frequency output of the tube 10 and consequently that of the next stage.

The high frequency response is controlled by a high frequency network including the T-pad formed by resistors 41, 42, condenser 50 and potentiometer 51 having a variable arm 52 which is connected to ground. One side of the condenser 50 is connected between the resistors 41 and 42 at a point 53 and the other side is connected to one side of the potentiometer 51. The other side of the potentiometer 51 is connected to a condenser 54 which is also connected to the plate of the tube 11.

Circuit constants may be selected to provide with a single control, the potentiometer 51, either attenuation or boost of treble frequencies. With the values of resistors 21, 41 and 42 unchanged from the previous values given herein and condenser 50 having a value of 500 micromicrofarads, condenser 54 having a value of 10,000 micromicrofarads and potentiometer 51 having a resistance of 2 megohms, a circuit is provided which with the single control potentiometer 51 will furnish a smooth transition from a high frequency boost of plus 15 decibels to high frequency attenuation of minus 12 decibels at 10,000 cycles per second (reference frequency 1,000 cycles per second) and vice versa.

Looking at the circuit diagram in the drawing, movement of the potentiometer arm 52 to the right increases the shunting effect of the condenser 54 across the output load of the tube 11 thereby by-passing a greater portion of the high frequencies to ground and attenuating the high frequency output. At the same time the arm 52 having been moved to the right the impedance to high frequencies is increased in the degenerative feedback circuit between ground and the junction 53 of resistors 41 and 42 thereby relatively increasing the high frequency voltages at junction 43 which, of course, results in some attenuation in the high frequencies at the output of the first stage because of the cancelling effect that the degenerative feedback voltage at high frequencies will have on the input signal.

To provide high frequency boost the potentiometer arm 52 may be moved to the left to reduce the high frequency shunting effect of the condenser 54 and thereby increase the impedance to high frequencies between the plate and ground. At the same time the resistance between ground and the condenser 50 is reduced thereby reducing the impedance to high frequency voltages between ground and the point 53 in the feedback circuit. This results in the by-passing of high frequencies in the degenerative feedback circuit to ground. As a result less degenerative high frequency voltage from the feedback circuit appears at the point 43 and less cancellation of the input signal takes place so that the output of the first stage and consequently that of the second stage will be increased with respect to voltages at high frequencies.

The high frequency control 51 and the low frequency control 33 operate independently of each other and each provides its respective circuit with a smooth transition from maximum attenuation of a particular band of frequencies through an arbitrary reference level to maximum boost of that band of frequencies. From the standpoint of design it is desirable that the circuit components be selected to provide substantially linear response at all frequencies within the range of the amplifier when the adjustable arms 34 and 52 are at the mid-point of the resistance elements in their respective potentiometers.

What is claimed is:

1. An apparatus for controlling the frequency response of a multi-stage electronic amplifier comprising a feedback circuit from the output circuit of one stage to the cathode circuit of a preceding stage, means including a series connection of a resistance and capacitance in said feedback circuit for applying the feedback signal to the cathode of said preceding stage, coupling means for coupling the output of said one stage to a device responsive to the output, a resistor connected between said coupling means and said feedback circuit, and means for connecting selected portions of said resistor to the output of said one stage for simultaneously changing the impedance to a selected band of frequencies between said output and the end of the coupling means opposite to the end adjacent to said output and inversely changing the impedance to said band of frequencies between said output and feedback circuits.

2. An electronic amplifier comprising a plurality of electronic tubes coupled in cascade fashion, each of said tubes having an anode, an input grid and a cathode, a degenerative feedback circuit connected to apply a signal from the anode circuit of one of said tubes to the cathode of a preceding tube, a coupling circuit having one end associated with the anode circuit of said one tube and its other end being adapted to be connected to a device responsive to the output of said one tube, a variable impedance connected to the anode of said one tube and common to said feedback circuit and to said other end of said coupling circuit for simultaneously changing the impedance to a selected band of frequencies between said anode of said one tube and said feedback circuit and said other end of said coupling circuit, respectively, said impedance change in said feedback circuit bearing an inverse relation to said impedance variation in said coupling circuit.

3. An apparatus for controlling frequency characteristics of a multi-stage electronic amplifier, said apparatus comprising a degenerative feedback circuit, means connecting said circuit to apply the feedback signal from the output of one stage of the amplifier to the cathode of a preceding stage of the said amplifier, a coupling circuit having one end connected to said output and the other end being adapted to connect to a device responsive to said output, an adjustable impedance device common to said other end of said coupling circuit and to said feedback circuit, means for coupling any portion of said impedance device to said output to simultaneously change the impedance to a selected band of frequencies in said feedback circuit and in said coupling circuit, the impedance changes in the feedback circuit being in an inverse relation to the impedance changes in the coupling circuit.

4. A multi-stage amplifier comprising a plurality of electronic tubes coupled in cascade manner, an input and an output circuit associated with each stage, a coupling circuit for coupling the output of one stage to a device responsive to said amplifier, and a variable impedance network associated with the output circuit of said one stage, said coupling circuit and the input circuit of a preceding stage, said network comprising a degenerative feedback circuit connected to apply a signal from the output circuit of said one stage to the cathode of said preceding stage and a variable impedance adjustable by a single control to change the voltage of a selected band of frequencies in said coupling circuit and simultaneously but in an inverse relation to change the voltage of said band of frequencies in said degenerative feedback circuit.

5. A multi-stage amplifier comprising a plurality of electronic tubes coupled in cascade manner, an input and an output circuit associated with each stage, and a variable impedance network associated with the output circuit of one stage and the input circuit of a preceding stage, said network including a degenerative feedback path between the output circuit of said one stage and the input circuit of said preceding stage and also a shunt across the load of the output circuit of said one stage and a single control means for adjusting the impedance of said network to change the voltage of a selected band of frequencies in the output circuit of said one stage and simultaneously but in an inverse relation to change the degenerative feedback voltage of said band of frequencies at the input circuit of said preceding stage.

6. An apparatus for controlling the frequency response of a multi-stage electronic amplifier having a degenerative feedback circuit including the series connection of two resistors and a capacitance connected between the output circuit of one stage and the cathode circuit of a preceding stage, said apparatus comprising a series connection of a capacitance, a resistance and a second capacitance in the order named connected between said output circuit and the junction of said two resistors, and adjustable means for grounding selected portions of said resistor for simultaneously effecting impedance changes to a selected band of frequencies between said output circuit and ground and inversely between the junction of said two resistors and ground.

7. An apparatus for controlling the frequency response of a multi-stage electronic amplifier having a degenerative feedback path connected between the output circuit of one stage and the cathode circuit of a preceding stage, said apparatus comprising an adjustable impedance connected intermediate the output circuit of said one stage and said feedback path and adjustably to ground to adjust the impedance to a selected band of frequencies between said output circuit and ground and to simultaneously adjust the impedance to said band of frequencies between said feedback circuit and ground inversely relative to the simultaneous change in impedance to said band of frequencies between said output circuit and ground, an output coupling circuit connected to said output circuit, and a second adjustable impedance connected intermediate said output coupling circuit and said degenerative feedback path and adjustably to said output circuit for adjusting the impedance to a second selected band of frequencies in said output coupling circuit and simultaneously adjusting the impedance to said second band of frequencies between said output coupling circuit and said feedback circuit inversely relative to the impedance change to said second band of frequencies in the output coupling circuit.

8. An electronic amplifier comprising a plurality of electronic tubes coupled in cascade fashion, each of said tubes having an anode, an input grid and a cathode, a degenerative feedback circuit connected between the anode circuit of one of said tubes and the cathode circuit of a preceding tube, a potentiometer having one end of its resistance element coupled to the feedback circuit and the other end coupled to the anode of said one tube, an adjustable contact on said potentiometer connected to ground, a coupling circuit having one end associated with the anode circuit of said one tube and its other end being adapted to be connected to a device responsive to the output of said one tube, a second potentiometer having one end coupled to said other end of said coupling circuit, the other end of said second potentiometer being coupled to said feedback circuit and an adjustable contact on said potentiometer connected to the anode of said one tube.

9. An apparatus for controlling the frequency response of a multi-stage electronic amplifier having a feedback circuit including a series connection of two resistors and a capacitance connected between the output circuit of one stage and the cathode circuit of a preceding stage, said apparatus comprising a series connection of a capacitance, a resistance and a second capacitance in the order named connected between said output circuit and the junction of said two resistors, adjustable means for grounding selected portions of said resistance for simultaneously effecting impedance changes to a selected band of frequencies between said output circuit and ground and in an inverse relation between the junction of the said two resistors and ground, coupling means for coupling the output of said one stage to a device responsive to the output, a resistor connected between said coupling means and said feedback circuit, and adjustable means for connecting selected portions of the last said resistor to the output of said one stage for changing the impedance to a selected band of frequencies between said output and the end of the coupling means opposite to the end adjacent to said output and simultaneously but in an inverse relation changing the impedance of said band of frequencies between said output and said feedback circuit.

10. A multi-stage electronic amplifier comprising a plurality of electronic tubes coupled in cascade fashion, each of said tubes having an anode, a grid and a cathode, a degenerative feedback circuit connected from the anode circuit of one stage to the cathode circuit of a preceding stage, a high frequency network for effecting by means of a single control between predetermined limits any degree of either attenuation or boost of a selected band of frequencies comprising a variable impedance common to the anode circuit of said one stage and to said feedback circuit and adjustably connected to ground for selectively changing the impedance to a selected band of frequencies between ground and said feedback circuit and simultaneously but in an inverse relation changing the impedance to said band between ground and the anode of the said one stage, a coupling circuit for coupling the anode output of said one stage to a device responsive to said output, and a low frequency network for effecting by means of a single control any degree of attenuation or boost between predetermined limits of a second selected band of frequencies comprising a second variable impedance common to said feedback circuit and to said coupling circuit and adjustably connected to the anode of the said one stage for selectively changing the impedance in said feedback circuit to a selected band of frequencies and simultaneously but in an inverse relation changing the impedance to said second band of frequencies in said coupling circuit.

11. An electronic amplifier comprising a plurality of electronic tubes coupled in cascade fashion, each of said tubes having an anode, a grid and a cathode, a high frequency network common to the anode circuit of one stage and to the cathode circuit of a preceding stage and adjustably connected to ground for effecting with a single control a smooth transition from maximum attenuation of a selected band of frequencies through an arbitrary reference level to maximum boost of said band of frequencies and vice versa, a coupling means for coupling the anode output of said one stage to a device responsive to said output, said coupling means being connected at one end to the anode of said one stage and its other end being adapted to be connected to said device responsive to said output, a variable impedance common to said coupling means and to the cathode circuit of said preceding stage and adjustably coupled to the anode of said one stage for effecting by means of a single control a smooth transition for maximum attenuation through an arbitrary reference level to maximum boost of a selected band of relatively low frequencies and vice versa.

12. A multistage electronic amplifier comprising a first stage amplifier tube having a signal input circuit and a signal output circuit, a later stage amplifier tube having a signal input circuit and a signal output circuit, a degenerative coupling circuit connected from the output circuit of said later tube to the input circuit of said first tube, a degeneration control circuit associated with said coupling circuit, an attenuating circuit connected to the output circuit of said later tube, and a potentiometer common to said degeneration control circuit and to said attenuating circuit, the variable point of said potentiometer being connected to a point whereby adjustment of the potentiometer in one direction will increase said degeneration and increase said attenuation and adjustment in the other direction will decrease said degeneration and decrease said attenuation.

13. A multistage electronic amplifier comprising a first stage amplifier tube having a signal input circuit and a signal output circuit, a later stage amplifier tube having a signal input circuit and a signal output circuit, a degenerative coupling circuit connected from the output circuit of said later stage tube to the input circuit of said first stage tube, and an attenuating and boosting network associated with said coupling circuit comprising a potentiometer, a capacitor connected to each end of said potentiometer, the variable point of said potentiometer being connected to a point in the circuit whereby movement in one direction will increase degeneration in the input to the first tube and increase attenuation in the output of the later tube and movement in the other direction will decrease said degeneration in the input to said first tube and decrease attenuation in the output of said later tube.

14. A multistage electronic amplifier comprising a first stage amplifier tube having a signal input circuit and a signal output circuit, a later stage amplifier tube having a signal input circuit and a signal output circuit, a degenerative coupling circuit connected from the output circuit of said later tube to the input circuit of said first tube, a degeneration control network associated with said degenerative coupling, an attenuation control network associated with said degenerative coupling, said networks having a potentiometer in common, a capacitor having low impedance for a predetermined frequency forming with said potentiometer the degeneration control network and a second capacitor having a low impedance for a predetermined frequency forming with said potentiometer an attenuation control network, the variable point of said potentiometer being adjustable in one direction to decrease degeneration and decrease attenuation and in the other direction to increase degeneration and increase attenuation.

15. A multistage electronic amplifier comprising a first stage amplifier tube having a signal input circuit and a signal output circuit, a later stage amplifier tube having a signal input circuit and a signal output circuit, a degenerative coupling circuit connected from the output circuit of said later tube to the input circuit of said first tube, a degeneration control network associated with said degenerative coupling, an attenuation control network associated with said degenerative coupling, said networks having a potentiometer in common, a capacitor having a low impedance for a predetermined frequency forming with said potentiometer the degeneration control network and a second capacitor having a low impedance for a predetermined frequency forming with said potentiometer an attenuation control network, the variable point of said potentiometer being connected to ground.

16. A multistage electronic amplifier comprising a first stage amplifier tube having a signal input circuit and a signal output circuit, a later stage amplifier tube having a signal input circuit and a signal output circuit, a degenerative coupling circuit connected from the output circuit of said later tube to the input circuit of said first tube, a degeneration control network associated with said degenerative coupling, an attenuation control network associated with said degenerative coupling, said networks having a potentiometer in common, a capacitor having low impedance for a predetermined frequency forming with said potentiometer the degeneration control network and a second capacitor having a low impedance for a predetermined frequency forming with said potentiometer an attenuation control network, the variable point of said potentiometer being connected to the anode of said later tube.

17. An audio amplifier comprising a plurality of cascade amplifiers each having an input and output circuit, an inverse feedback from the output circuit of a later amplifier to the input circuit of an earlier amplifier, said inverse feedback including a resistor, a frequency discriminating circuit connected in parallel with said feedback resistor and comprising a potentiometer having a capacitor at either end thereof and a movable tap connection to ground, whereby high frequency signals from said output circuit are substantially grounded when the inverse feedback of said signals is maximum and vice versa.

18. An audio amplifier comprising a plurality of amplifier stages each including a vacuum tube having a signal grid, a cathode and an anode, an inverse feedback from the anode of a later tube to the cathode of an earlier tube said inverse feedback including a blocking condenser and a resistance in series therewith, a potentiometer having a capacitor connected to each end thereof and all connected in parallel with said blocking condenser and resistance, the variable tap of said potentiometer being connected to ground whereby high frequency signals from the output of said later stage are substantially grounded when the inverse feedback of said frequencies is greatest and the inverse feedback of said high frequency signals is least when said signals are least grounded.

RONALD A. MAKEPEACE.

REFERENCES CITED

The following references are of record in the file of this patent:

UNITED STATES PATENTS

| Number | Name | Date |
|---|---|---|
| 2,093,245 | Van Loon | Sept. 14, 1937 |
| 2,101,688 | Rechnitzer | Dec. 7, 1937 |
| 2,186,571 | Beale | Jan. 9, 1940 |
| 2,217,178 | Masters | Oct. 8, 1940 |
| 2,255,757 | Bierwirth | Sept. 16, 1941 |
| 2,282,870 | Lundie | May 12, 1942 |
| 2,444,076 | Visschers | June 29, 1948 |